US006257522B1

(12) United States Patent
Friend et al.

(10) Patent No.: US 6,257,522 B1
(45) Date of Patent: Jul. 10, 2001

(54) MULTI-BEAM METHOD AND APPARATUS FOR REMOVING AND REPLACING MAJOR STRUCTURAL COMPONENTS WHILE CONVERTING AN AIRPLANE TO EFFICIENTLY CARRY FREIGHT

(75) Inventors: John D. Friend, Towanda; Michael W. Swank, Wichita; David B. Hime, Wichita; Jack M. Whitney, Wichita; Michael J. Wieland, Wichita; Arthur W. Burden, Augusta; Daniel J. Johnson, Oxford; Velma C. Keyser, Wichita; Bruce A. Chappell, Wichita, all of KS (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/353,578

(22) Filed: Jul. 15, 1999

Related U.S. Application Data

(63) Continuation-in-part of application No. 09/052,803, filed on Mar. 31, 1998, now abandoned.
(60) Provisional application No. 60/042,200, filed on Mar. 31, 1997.

(51) Int. Cl.[7] ........................................................ B64F 5/00
(52) U.S. Cl. ...................................... 244/118.1; 254/89 R
(58) Field of Search ................................. 244/1 R, 118.1; 254/89 R, 418

(56) References Cited

U.S. PATENT DOCUMENTS

| 3,051,419 | * | 8/1962 | Weiland et al. | 244/118.1 X |
| 4,378,098 | * | 3/1983 | Evans | 244/118.1 X |
| 4,593,871 | * | 6/1986 | Nichols | 244/118.1 X |
| 4,648,570 |   | 3/1987 | Abdelmaseh et al. | 244/118.1 |
| 5,090,639 |   | 2/1992 | Miller et al. | 244/118.1 |

* cited by examiner

Primary Examiner—Robert P. Swiatek
(74) Attorney, Agent, or Firm—Conrad O. Gardner

(57) ABSTRACT

A method of removing and reinstalling multiple floor-beams concurrently while minimizing aircraft movement. The airplane is supported with jacks in a manner that minimizes internal shear and bending moment stresses. All floor-beams needing to be replaced are removed concurrently. All floor-attach structure such as floor panels, intercostals, seat-tracks, hard points, cargo handling equipment, and electrical and hydraulic standoffs is also removed. Deformation of the airplane is monitored and any significant deformation is restored. A floor-beam complex consisting of floor-beams, and all floor-attach structure such as floor panels, intercostals, seat tracks, hard points, cargo-handling equipment, and electrical and hydraulic standoffs is installed in place of the removed floor structure. The floor-beam complex has splices to facilitate handling during installation. More than one floor-beam complex may be required for a complete airplane. A special lifting tool is utilized to load the floor beam complex into the airplane.

2 Claims, 15 Drawing Sheets

| JACK POINT | NOSE CONE CRADLE | NOSE CRADLE | LIFT FITTING | 3 FRAME CRADLE | 3 FRAME CRADLE | LIFT FITTING | I & II | KEEL BEAM | KEEL BEAM | IV & V |
|---|---|---|---|---|---|---|---|---|---|---|
| BODY STATION | 138 | 400 | 570 | 600 | 660 | 890 | 993 | 1236 | 1480 | 1516 |
| NUMBER OF JACKS | 1 | 1 | 2 | 1 | 1 | 2 | 2 | 1 | 1 | 2 |
| MAX STATIC LOADS (LBS) | 8,000 | 16,000 | 4,000 | 36,000 | 36,000 | 4,000 | 200,000 | 48,700 | 35,500 | 30,000 |
| * NOT TO EXCEED THE (LBS) PER JACK | | | | | | | | | | |
| JACK TOLERANCES | ±500 | ±500 | +0/−500 | ±500 | ±500 | +0/−500 | ±3000 | ±500 | ±1000 | ±1000 |
| JACK LOADS AT FINAL POSITION (LBS) AS NOTED BELOW | | | | | | | | | | |
| AIRPLANE MODEL 747-200 | 6,500 | 12,500 | 4,000 | 4,000 | 3,500 | 4,000 | 26,500 | 16,500 | 9,500 | 22,000 |

Fig. 5

| JACK POINT | PROD LIFT FITTING SUPPORT | II & VII | PROD LIFT FITTING SUPPORT | TAIL CRADLE | MUTI-FRAME CRADLE | MUTI-FRAME CRADLE | BODY CRADLE | III | WING SPARE SUPPORT |
|---|---|---|---|---|---|---|---|---|---|
| BODY STATION | 1610 | 1681.5 | 2120 | 2484 | 1720 | 1980 | 2180 | 2596 | WS 557 F SPAR |
| NUMBER OF JACKS | 2 | 2 | 2 | 1 | 2 | 2 | 1 | 1 | 2 |
| MAX STATIC LOADS (LBS) | 16,300 | 25,000 | 17,700 | 31,000 | 16,000 | 16,000 | 16,000 | 98,800 | 40,000 |
| * NOT TO EXCEED THE (LBS) PER JACK | | | | | | | | | |
| JACK TOLERANCES | ±1000 | ±500 | ±500 | ±1000 | ±250 | ±250 | ±500 | ±1000 | ±500 |
| JACK LOADS AT FINAL POSITION (LBS) AS NOTED BELOW | | | | | | | | | |
| AIRPLANE MODEL 747-200 | 8,300 | 12,600 | 4,500 | 8,500 | 2,375 | 2,125 | 5,000 | 8,000 | N/A |

Fig. 6

MULTI-BEAM METHOD AND APPARATUS FOR REMOVING AND REPLACING MAJOR STRUCTURAL COMPONENTS WHILE CONVERTING AN AIRPLANE TO EFFICIENTLY CARRY FREIGHT

CROSS-REFERENCE TO RELATED APPLICATIONS

This application is a continuation-in-part of prior application Ser. No. 09/052,803, filed Mar. 31, 1998, now abandoned, claimed the benefit of provisional application No. 60/042,200, filed Mar. 31, 1997.

BACKGROUND OF THE INVENTION

This invention relates to the modification or conversion of passenger carrying aircraft to freight carrying aircraft and, more particularly, to a method of supporting such an aircraft without damage while major structural components, particularly floor-beams, are being removed and replaced.

When aircraft are converted for freight carriage, stronger structural components are sometimes required as a result of the extra weight imposed by the cargo. This is accomplished by reinforcing some structural components and removing some of the weaker components and replacing them with stronger components. The quantity of structural components that may be removed concurrently is limited to prevent significant deformation of the aircraft. The greater the amount of work that may be accomplished concurrently, the quicker the aircraft may be put back into revenue generating service. The aircraft is supported, usually with jacks and cradles, in an attempt to minimize deformation.

The floor structure, which may consist of floor-beams, floor panels, seat tracks, intercostals, hard point fittings, cargo handling equipment, and hydraulic and electrical standoffs, often represents a significant quantity of the structural items that must be removed and replaced with stronger components. Replacement is usually limited to every other floor-beam at a time. This requires that each floor-beam be carefully located to ensure a flat level floor. The remaining floor structure is then located and installed. This installation is accomplished by mechanics working in confined quarters beneath the floor-beams or lying on top of the floor-beams. This difficult process is labor intensive and contributes significantly to the down time required to modify the aircraft. Small errors in locating parts often compound and result in re-assembly fit problems requiring unique repairs for each occurrence. This decreases the quality of the product and adds to the down time and the expense associated with the aircraft modification. Minor movement of the fuselage can also compound into re-assembly fit problems.

In the time period after the floor beams are installed and prior to the installation of the rest of the floor structure, the floor beams are unstable thus presenting hazardous conditions to individuals working inside the aircraft. In addition, dropped tools and parts represent a hazard to mechanics and other people working below the floor beams. Drill shavings, created while installing floor structure components, fall into the lower lobes of the aircraft. Cleaning up these drill shavings, in the confined area of the lower lobes is difficult and time consuming.

BRIEF SUMMARY OF THE INVENTION

According to an aspect of the invention, a method of supporting the aircraft with jacks is improved such that the internal fuselage shear and bending stresses are minimized resulting in minimum aircraft deformation during modification. This allows for the disassembly of additional structure concurrently with minimum deformation to the aircraft. Measurements are made at strategic locations in areas where major disassembly will occur, particularly laterally across the fuselage in the vicinity of the floor-beams that are to be removed.

The aircraft is weighed and panel weights are developed in a manner typical of the industry. A mathematical model representing the load distribution of the fuselage is created from the panel loads. The support, or jack, locations are then superimposed on the mathematical model, representing reactions to the load distribution. The reactions are manipulated to minimize internal shear and bending moment stresses internal to the fuselage. The sum of the reactions must closely balance the weight of the fuselage. In addition the CG of the jacks must closely approximate the CG of the fuselage. The amount of load at any support location must be low enough to preclude any localized deformation of or damage to the fuselage. Once the required jack loads are determined, the aircraft is jacked on the three main jacks. The remaining jacks are located as determined above and then loaded simultaneously to their proper loads. All jacks are then locked in place and the modification work (including floor-beam removal) begins.

The required jacking scheme will vary from one type of aircraft to another. Even within a family of airplanes the weight and CG may vary enough to change the support scheme. The amount of structural disassembly and the location of the disassembly will also change the support scheme.

Sound engineering judgement is required in developing the mathematical model and in choosing and locating the supports. Consideration is given to representing heavy components as point loads on the model, subtracting them from the panel weights. Knowledge of the aircraft's design philosophy, and physical characteristics are important in determining the maximum allowable shear and bending moment, usually expressed as a percentage of ultimate design shear and bending moment, allowed that will prevent significant or catastrophic failure. Specific knowledge of aircraft components is required to determine how much, if any, deformation of the fuselage is acceptable.

In accordance with an aspect of this invention, the floor structure is built into a floor-beam complex prior to aircraft modification beginning. This allows for more sophisticated tooling to be utilized when locating and installing floor structure components, improving the quality of the product while decreasing the required number of unique repairs. The flatness of the floor is particularly enhanced. This method also allows for a safer and more convenient work environment. The risk of mechanics and other individuals falling due to unstable beams is eliminated. Dropped parts and tools no longer put mechanics or other individuals at risk to injury. The drill shavings associated with the floor-beam complex no longer fall into the constricted lower lobes of the aircraft, thus greatly decreasing the time previously expended in clean up activity. Furthermore, all work accomplished prior to the beginning of the aircraft modification, decreases aircraft down time and contributes to the aircraft beginning revenue-producing flights more quickly.

The size and quantity of complexes built vary depending on the nature of the modification, the size of the opening in the fuselage through which the complex is loaded, and the particular aircraft being modified. The floor-beam complex may require additional splices, beyond those on a conventional floor structure, to accommodate handling and installation. The locations of these splices vary dependent upon component geometry, manufacturing considerations, and the size of the floor beam complex. The splices are predrilled and become locating tools upon installation on the complex. Some components, such as floor panels, may require temporary removal from the complex to provide access to these splices.

Another aspect of this invention is the special tool utilized in loading the floor complexes. The geometry of the tool may vary dependent upon the size of the floor complexes, the geometry of the aircraft fuselage, and the size of the opening in the fuselage through which the complexes are loaded. The tool includes a strong back that attaches to the floor complex, typically to hard points and seat tracks. It is important for the strong back to be sufficiently rigid to prevent the complex from twisting and becoming damaged during its transport and that sufficient attachment points be provided to preclude localized damage to the floor structure. The strong back is attached to the c-shaped member of the tool by a gimbal capable of two degrees of rotation. This allows the complex to be tilted between the horizontal and vertical planes and rotated about the gimbal. Counter weights are utilized to balance the strong back and floor structure. A crane or some similar device is utilized to lift the tool and the attached floor complex. The c-shaped tool must be of sufficient size to preclude it from striking the aircraft fuselage during use. The c-shaped tool, while generally c-shaped may take on different shapes for different aircraft.

The floor complexes are loaded into the fuselage and located in place. The complexes are supported by conventional tools located in the lower lobes prior to installation and are maneuvered by a conventional rail and roller system. The floor complex splices are then joined together. Floorbeams not removed yet, or not to be removed during the modification are utilized to establish the correct waterline of the new complex. A final check is made to ensure no significant fuselage deformation has occurred. Any significant deformation is restored prior to attaching the floor beams to the frames.

This invention has been executed on several Boeing 747s undergoing various conversions: 1) from passenger carrying aircraft to freight carrying aircraft 2) from combi (which carry passengers in the front of the aircraft and freight in the rear) to full freighters, and 3) from passenger carrying aircraft to combi.

On the conversion of an aircraft from a passenger carrying aircraft to a freight carrying aircraft, the invention decreased down time by approximately 10 manufacturing days. The number of unique repairs has decreased 75% common to the floor structure. Movement laterally across the fuselage, at floor beam elevation, has been virtually eliminated along with the associated fit up problems. This movement is usually less than 0.005 inch and only rarely exceeds 0.01 inch. Any minor movement encountered is easily restored. Complex sizes have ranged from 9 to 24 floor beams. Larger complexes are possible. Removable cargo handling equipment installs and removes more easily as a result of the flatter floor. The lower lobes of the aircraft remain cleaner, requiring less clean up. Injuries associated with working on unstable floor-beams have been eliminated. Parts and tools dropped from the main deck no longer are hazards for people working in the lower lobes.

Further features of the invention will be apparent from the following description of a preferred embodiment thereof with references to the accompanying drawings.

BRIEF DESCRIPTION OF THE SEVERAL VIEWS OF THE DRAWING

FIGS. 5 and 6 are typical data sheets indicating jack locations and loads, utilizing twenty-nine jacks.

DETAILED DESCRIPTION OF THE INVENTION

Figure 1:
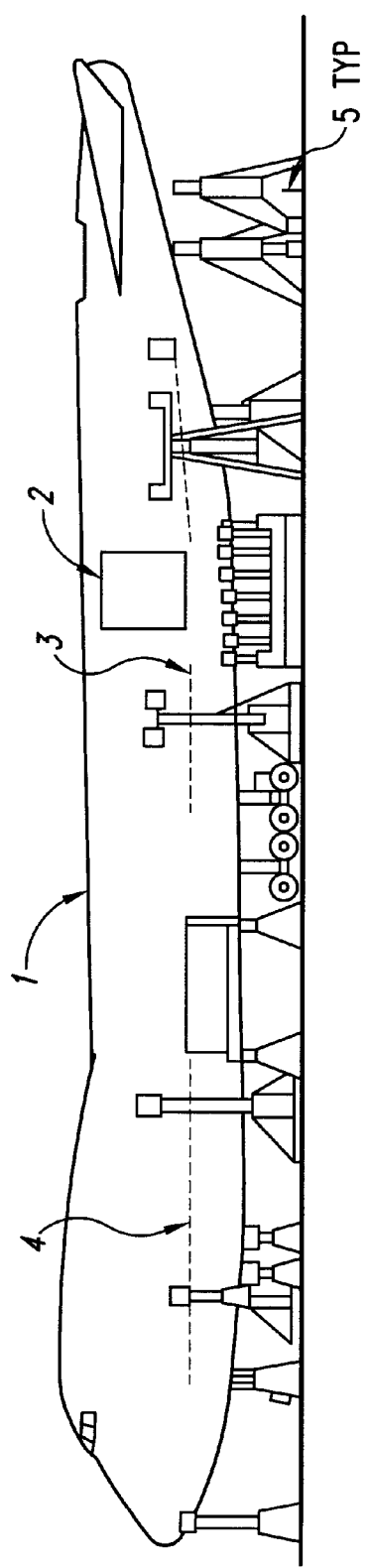
FIG. 1 is a side elevation view of a passenger airplane to be converted to a freighter, with jacks in place.

FIG. 1 side elevation view of an airplane 1 that will be converted to a freight carrying aircraft. A main cargo door 2 is near the center of the aft deck beams 3 (shown by dashed line) requiring replacement. A dashed line also indicates a forward set of deck beams 4. A multitude of jacks 5 is schematically depicted.

Figure 2:
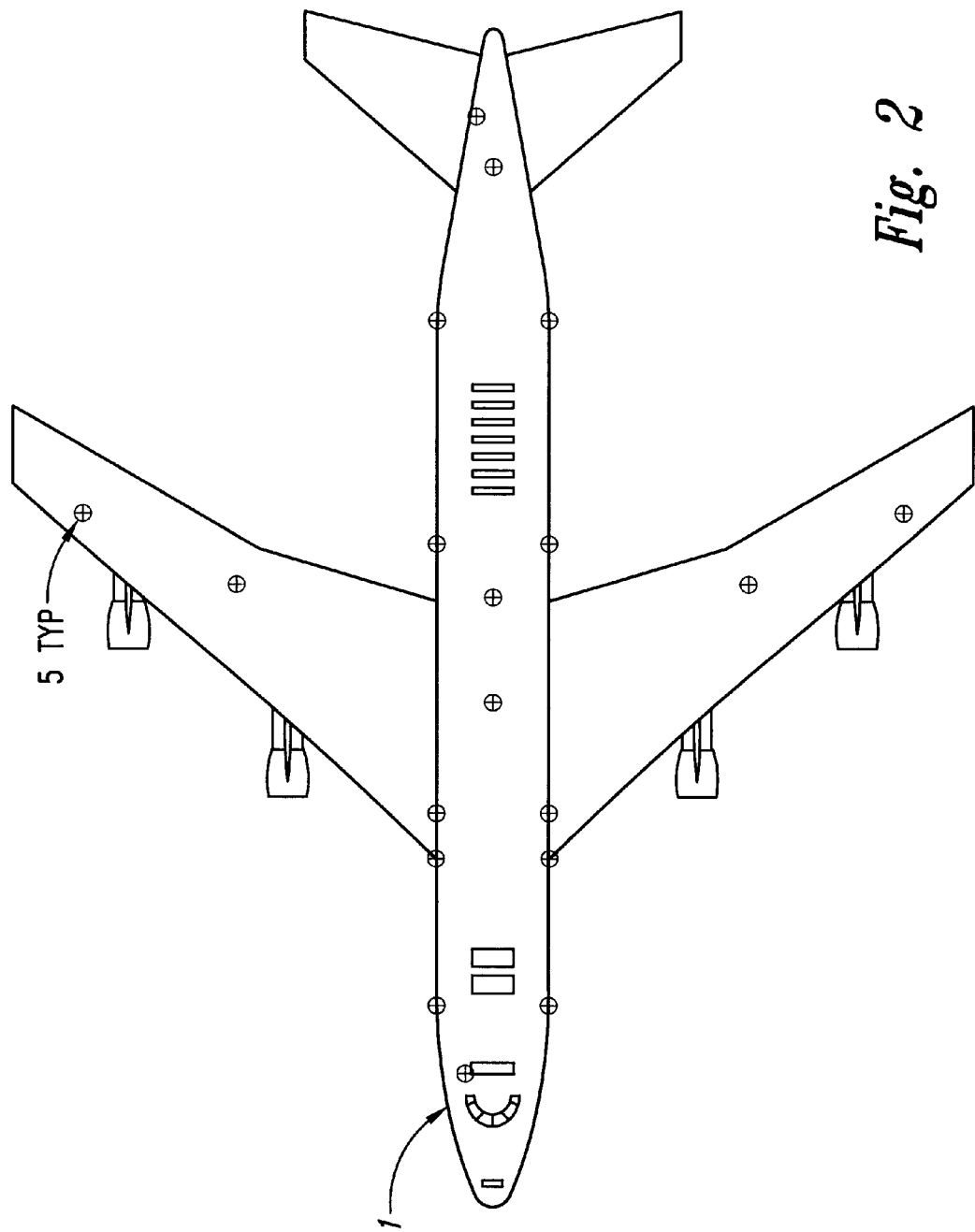
FIG. 2 is a plan view of the airplane of FIG. 1.

FIG. 2 plan form view of an airplane 1 that will be converted to a freight carrying aircraft. A multitude of jacks 5 is schematically depicted. The quantity, placement and types of jacks 5, indicated on FIGS. 1 & 2, will be unique for each different model of aircraft to be modified using the method described herein.

Figure 3:
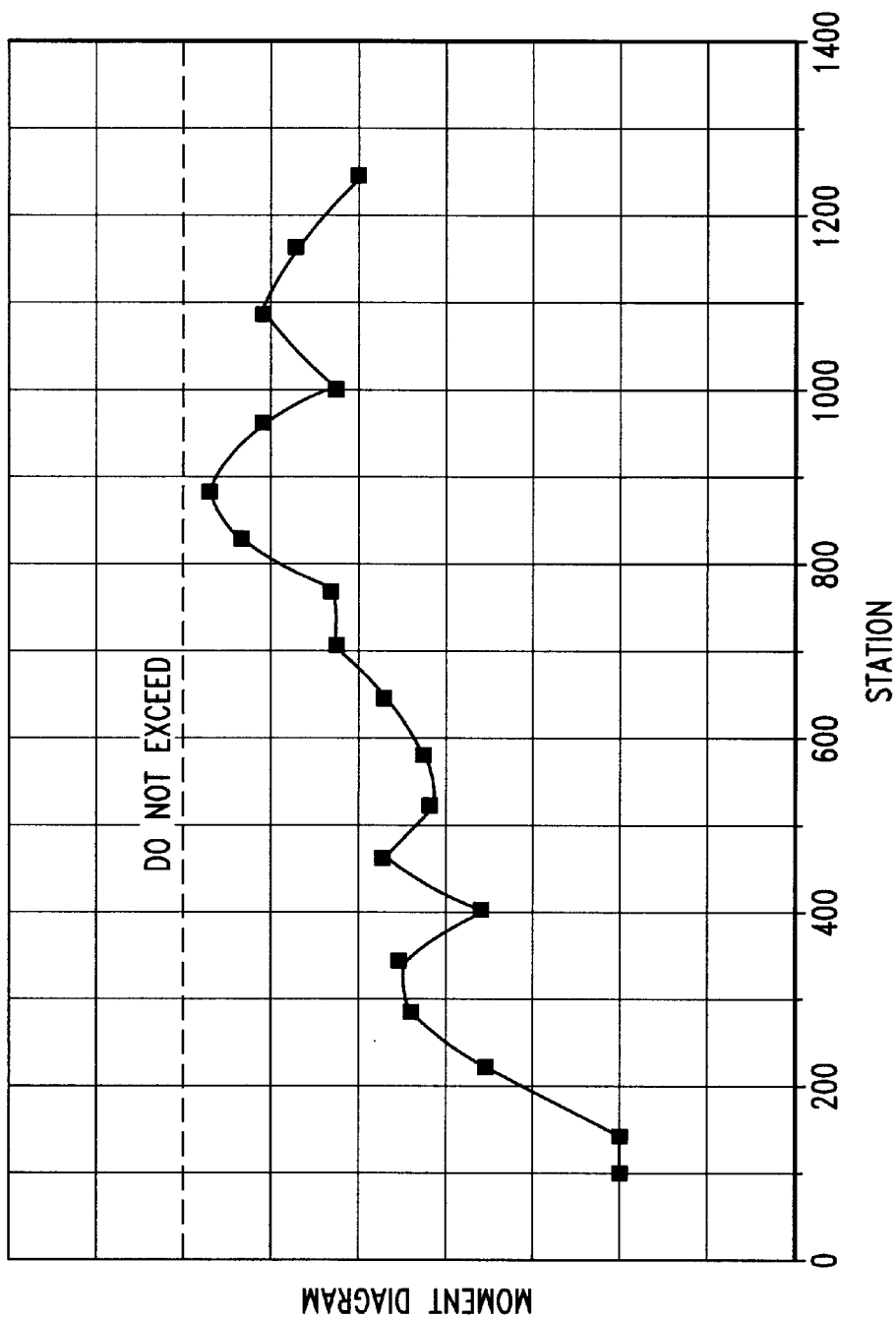
FIG. 3 is a view of a typical moment diagram for the forward end of the fuselage when supported by jacks.
Figure 4:
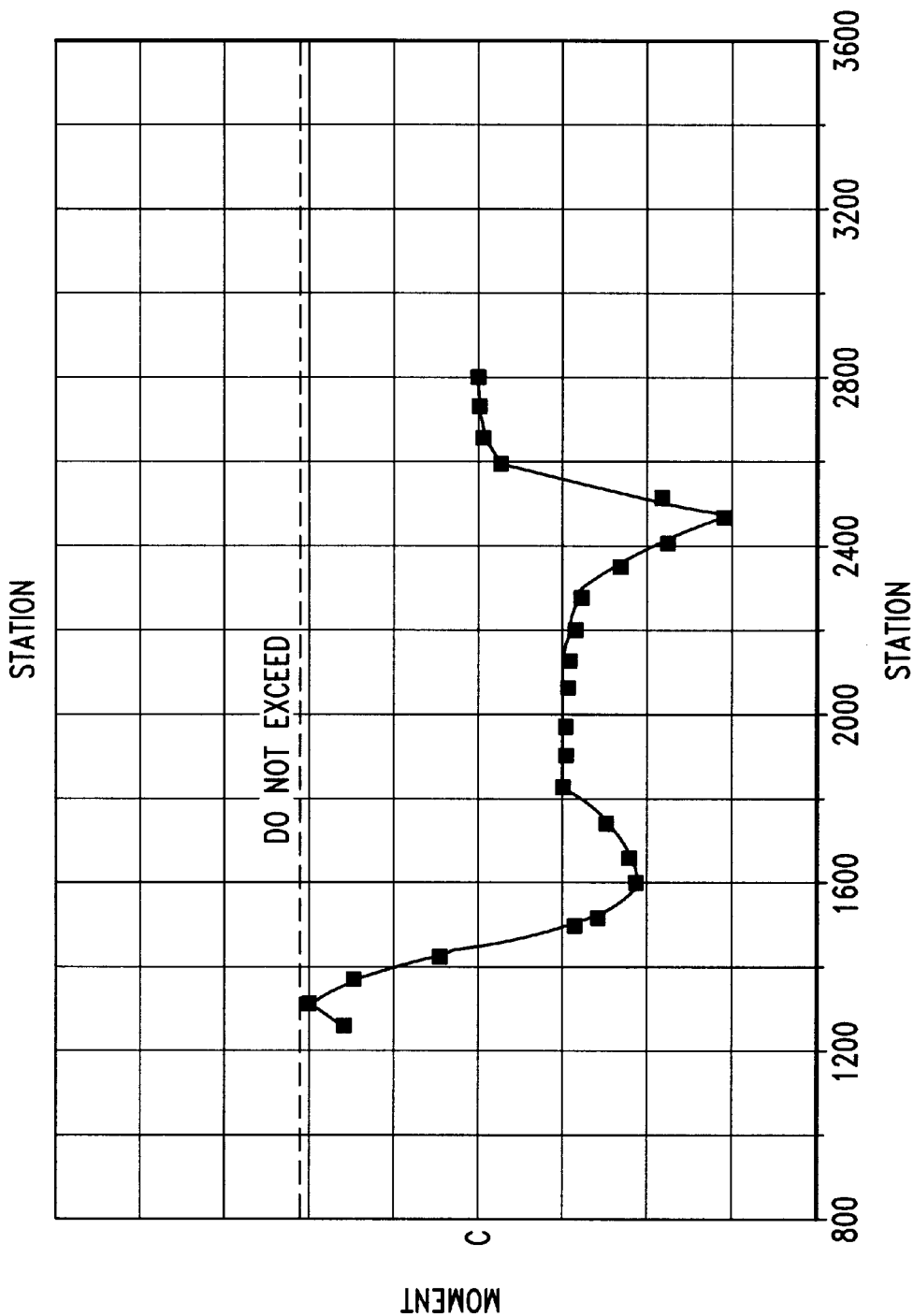
FIG. 4 is a view of a typical moment diagram for the aft end of the fuselage when supported by jacks.

FIGS. 3 & 4 show a typical moment stress data plot of an aircraft supported by jacks as described herein. A "Do not exceed" limit based upon aircraft ultimate design loads, to be used as a guide for determining suitable jack loads so as to minimize aircraft deformation during structural modifications, is depicted.

FIGS. 5 & 6 show a typical data table containing jack placement locations, the maximum allowable static loads for each jack that precludes damage to a fully assembled aircraft, and a final jack load solution developed utilizing the methods described herein.

Figure 7:
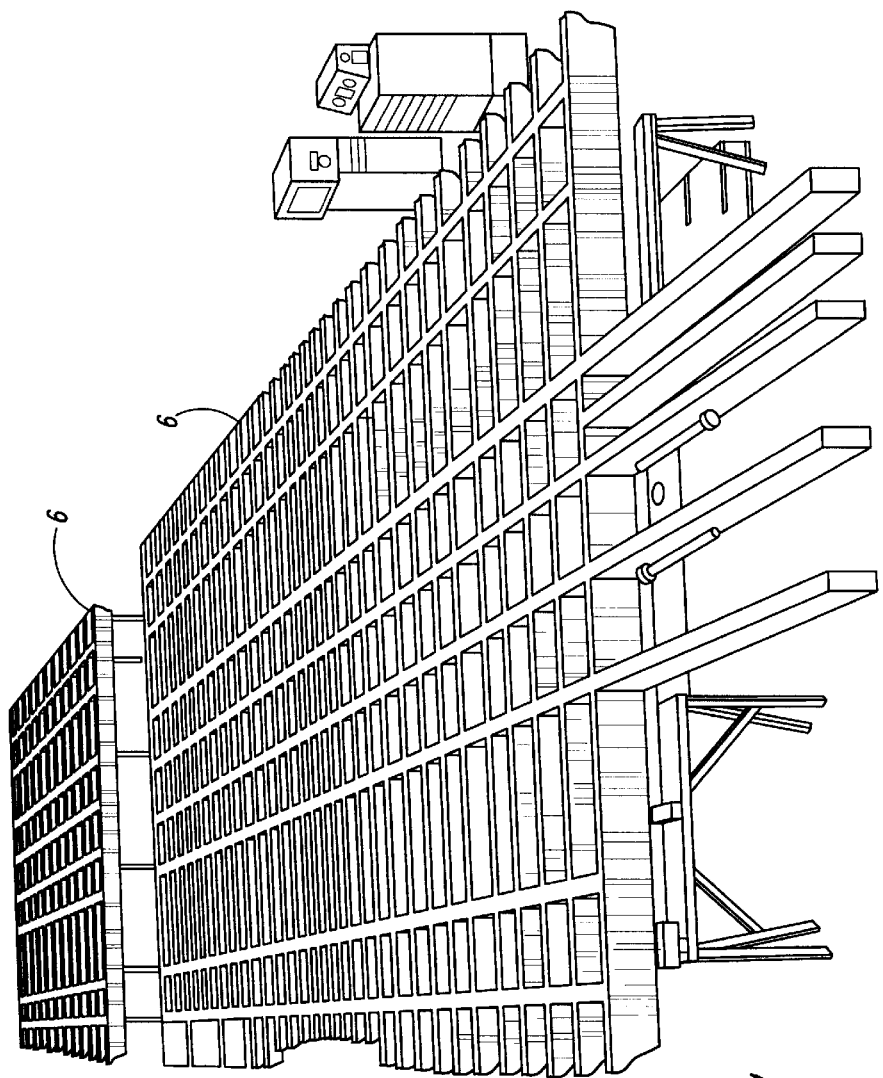
FIG. 7 is a view of the manufacture of a new floor complex.

FIG. 7 shows the manufacture of two sets of floor beam complexes 6 that will be installed in the aircraft. All components that make up a conventional floor are included in the complexes, including floor beams, floor panels, intercostals, seat tracks, hard points, cargo handling equipment, and hydraulic and electrical standoffs. Additional splices may be added to facilitate handling and installation of the complexes.

FIGS. 8–17 show the sequence of a lifting tool 8 which is supported by an overhead lifting fixture 11, such as a crane, delivering the assembled floor beam complex 7 into the fuselage 12 through the main cargo door 2 and maneuvering the complex 7 into place for installation. The lifting tool 8 incorporates a gimbal 9 to which a strong-back 15 is attached. The complex 7 is directly attached to the strongback 15. In conjunction with the overhead lifting fixture 11 and the C-shaped lifting tool 8, an operator 10 uses a hand-held control system to manipulate the gimbal 9 and is thus able to assist in guiding the complex 7 into position.

Figure 8:
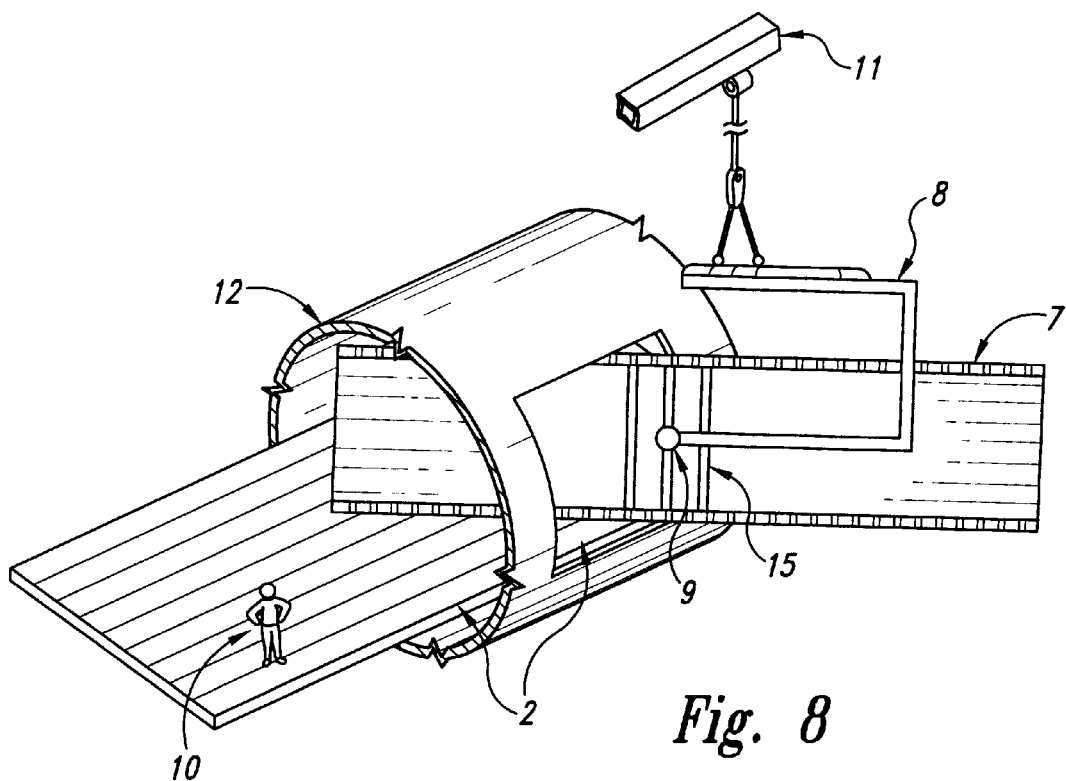
FIGS. 8 through 17 are isometric views of the c-shaped lifting tool of this invention.
Figure 9:
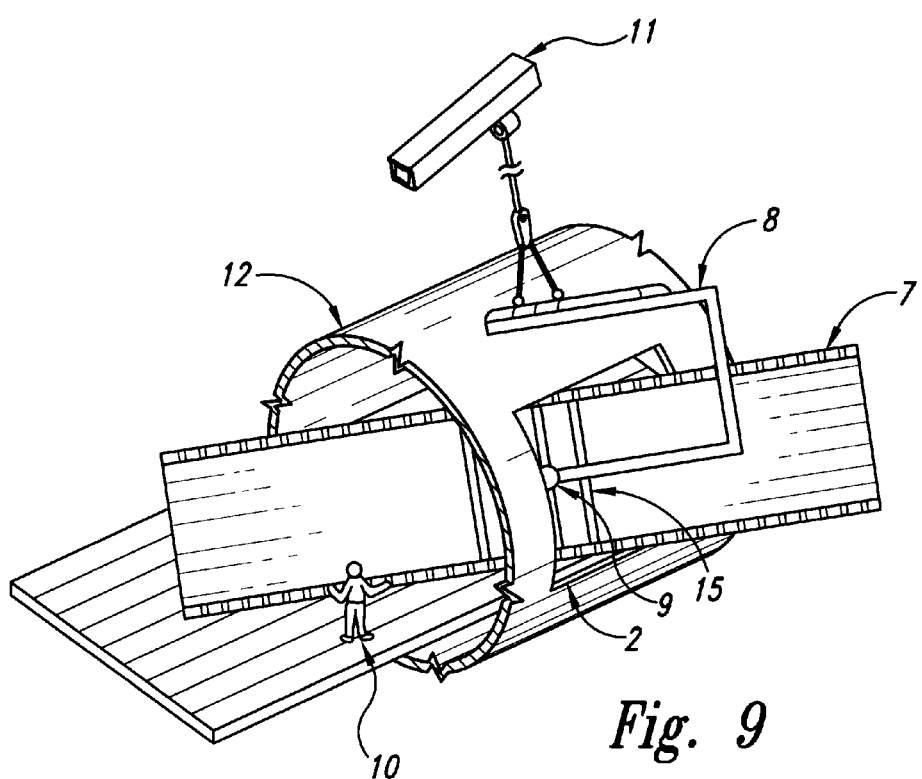
Figure 10:
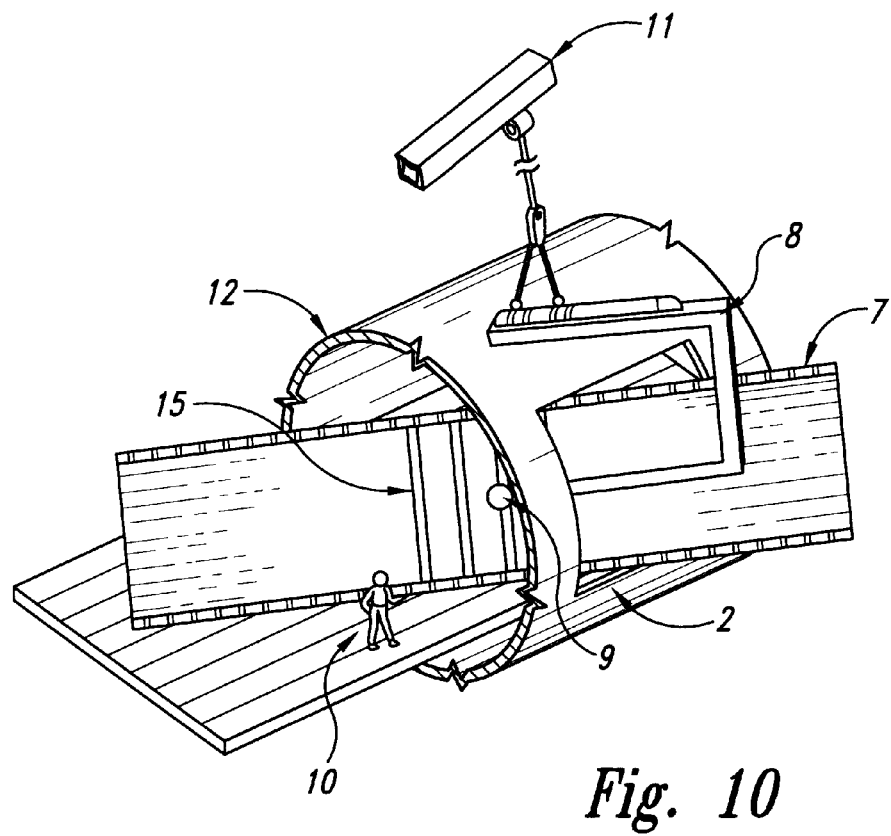
Figure 11:
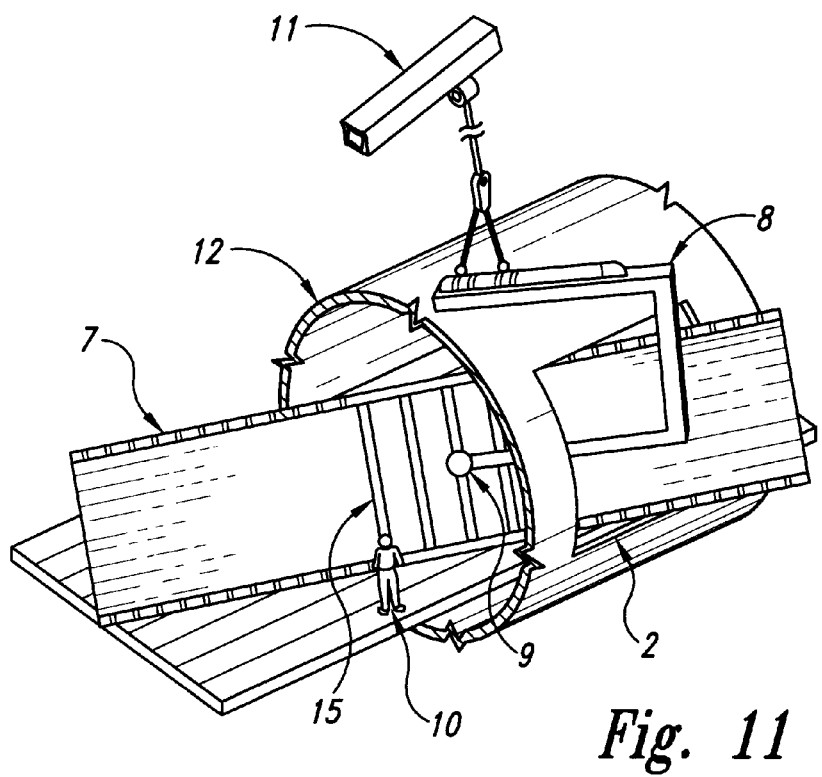
Figure 12:
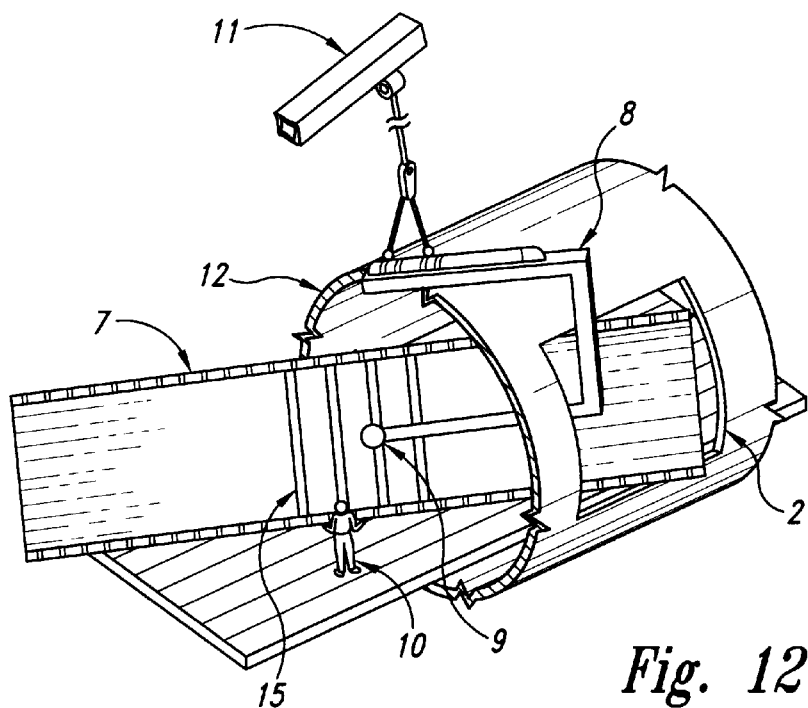
Figure 13:
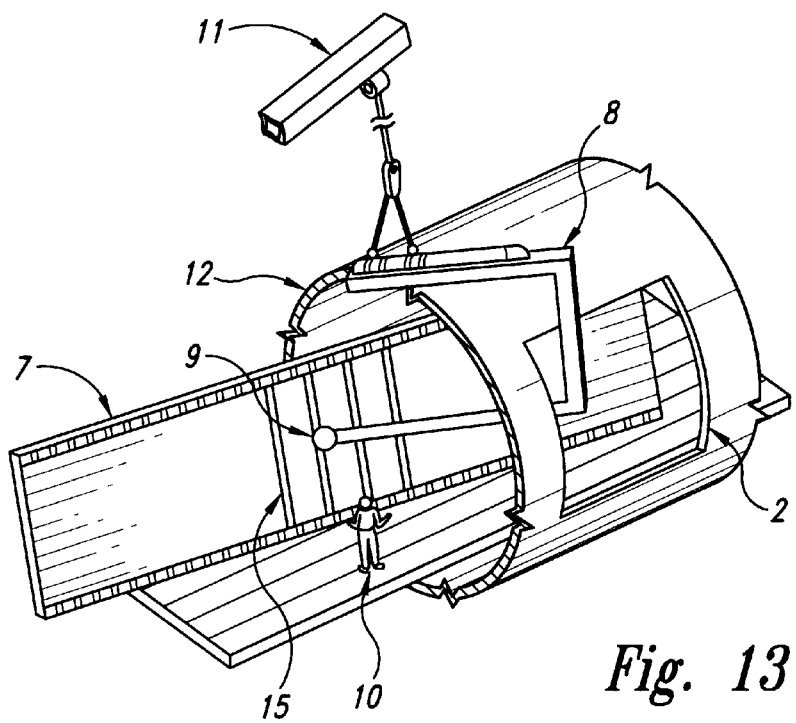
Figure 14:
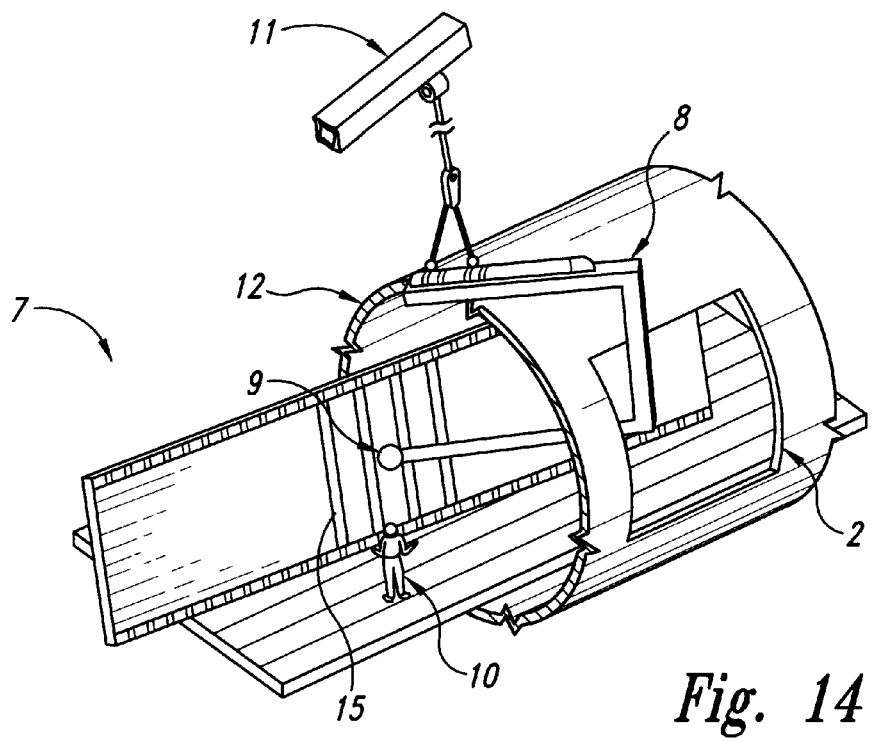
Figure 15:
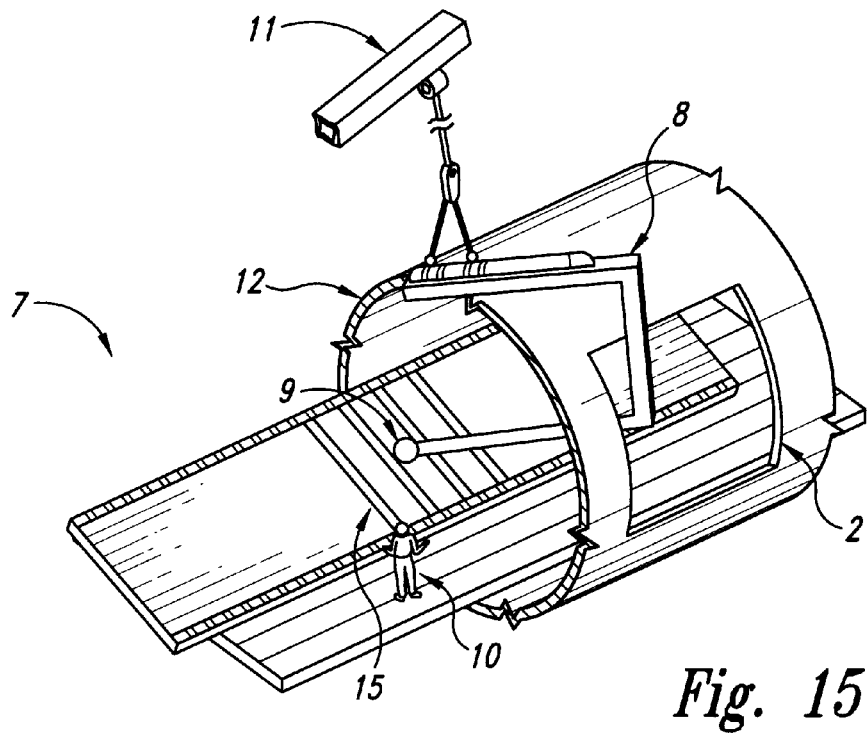
Figure 16:
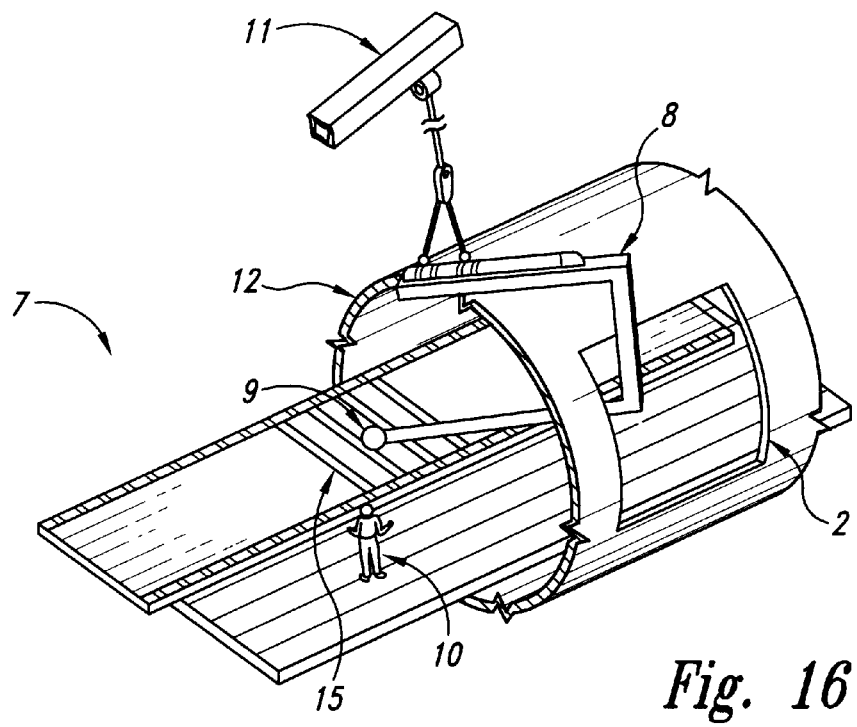
Figure 17:
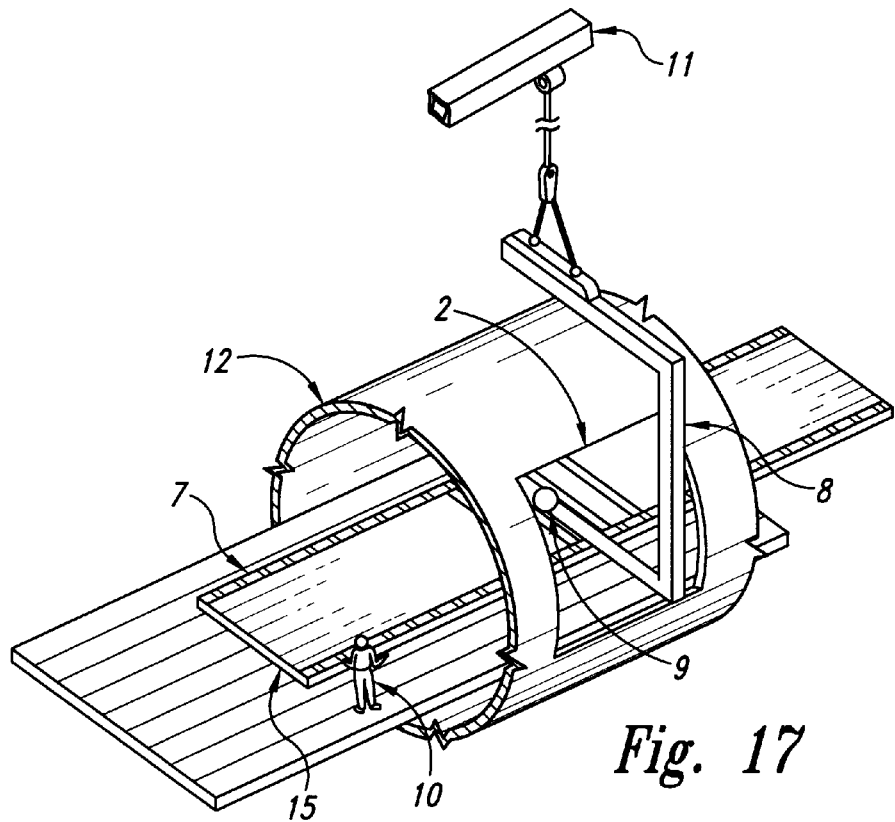

FIG. 8 specifically shows the complex 7 in the vertical position being maneuvered into the fuselage 12 through the main deck cargo door 2 by the over-head lifting fixture 11.

FIGS. 9, 10, 11, 12, and 13 show the complex 7 and the strong-back 15, still in the vertical position rotating about the gimbal 9 as the overhead lifting fixture 11 continues to load the complex 7 into the fuselage 12.

FIGS. 14, 15, 16, and 17 show the complex 7 and the strong-back 15, completely inside the fuselage 12. The operator 10 is utilizing the hand held remote to begin to bring to rotate the complex 7 about the gimbal 9 into the horizontal plane.

Figure 18:
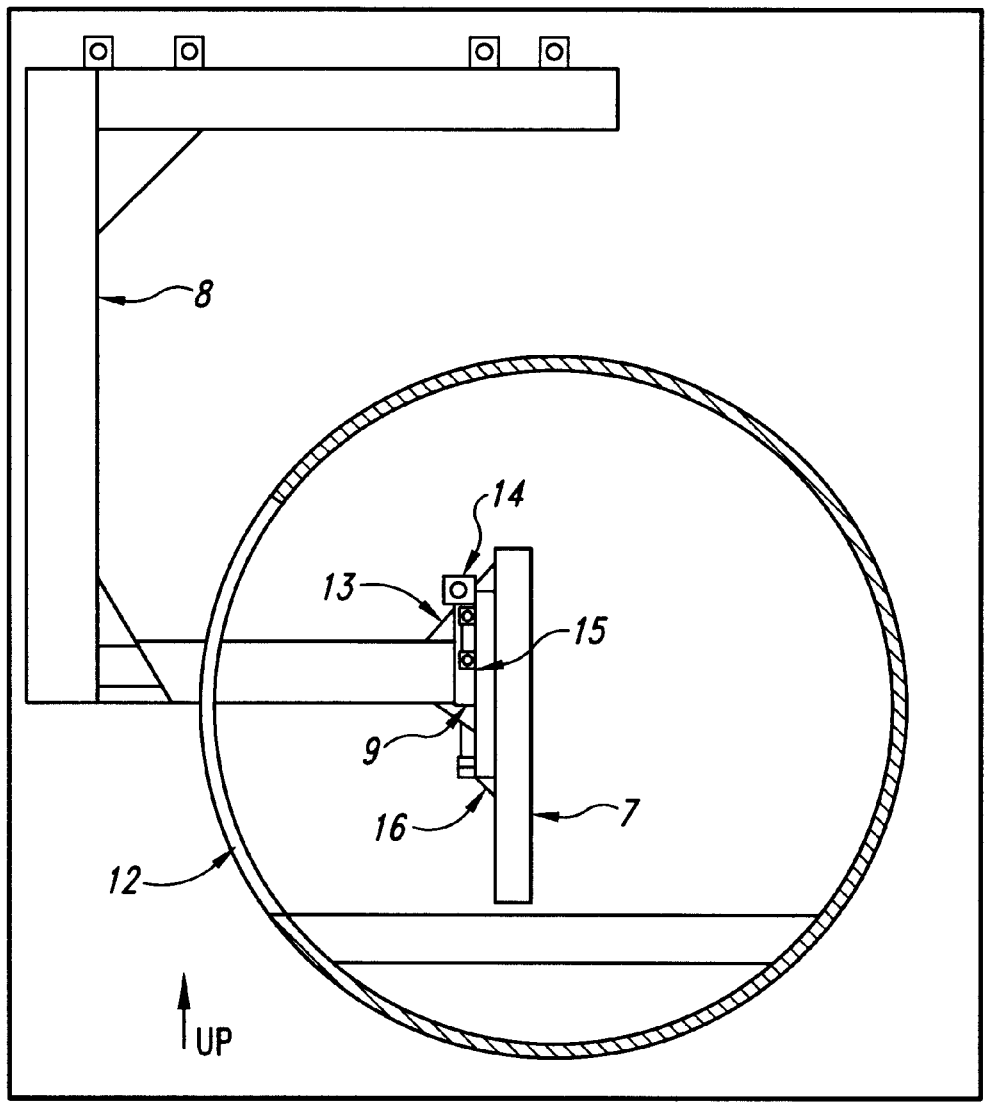
FIG. 18 is a cross section view of showing the c-shaped tool of this invention.

FIG. 18 shows the C-shaped lifting tool 8, the integral gimbal 9 system and the strong back 15 engaged to complex 7. A cable 13 is attached to the C-shaped lifting tool 8. A pneumatic motor 14 is attached to the strong-back 15. A component of the strong-back 15 is the hard-point or seat track attachments 16 that are temporarily attached, during transport, to the floor-beam complex 7. This view is a cross sectional view of the floor beam complex 7 in the fuselage 12 prior to being placed in the horizontal plane.

Figure 19:
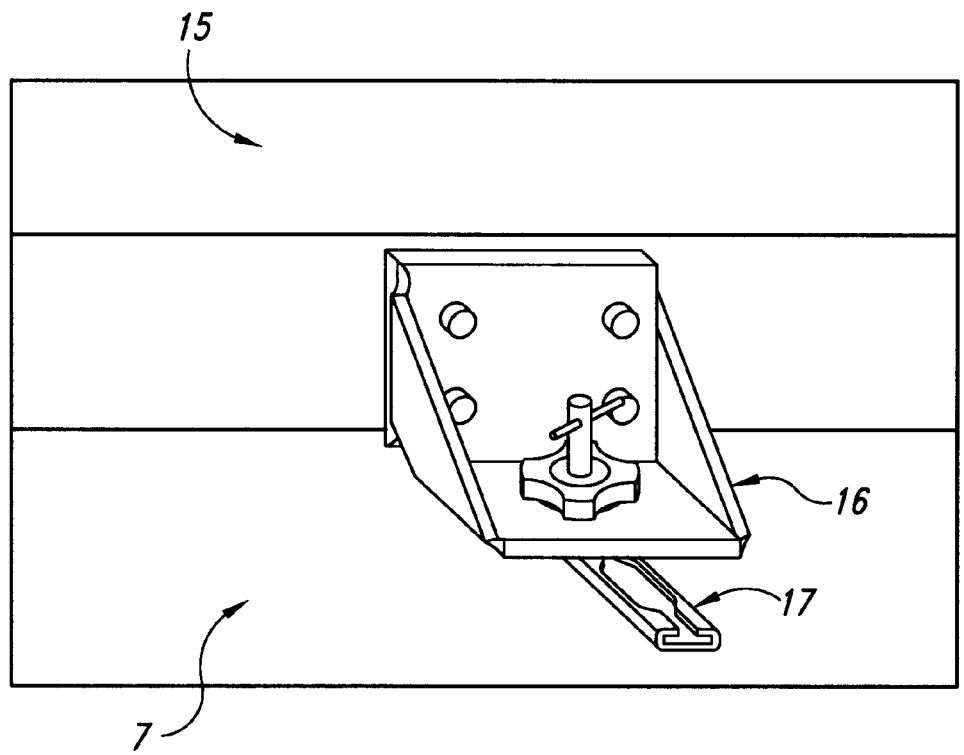
FIG. 19 shows a typical hard point or seat track attachment and a strong back.

FIG. 19 shows the strong back 15 and an attachment fitting 16 in a typical configuration used for attaching a floor beam complex 7 to the strong-back 15. The attachment fitting 16 engages a seat track or hard-point 17 that is an integral part of the floor beam complex 7.

Figure 20:
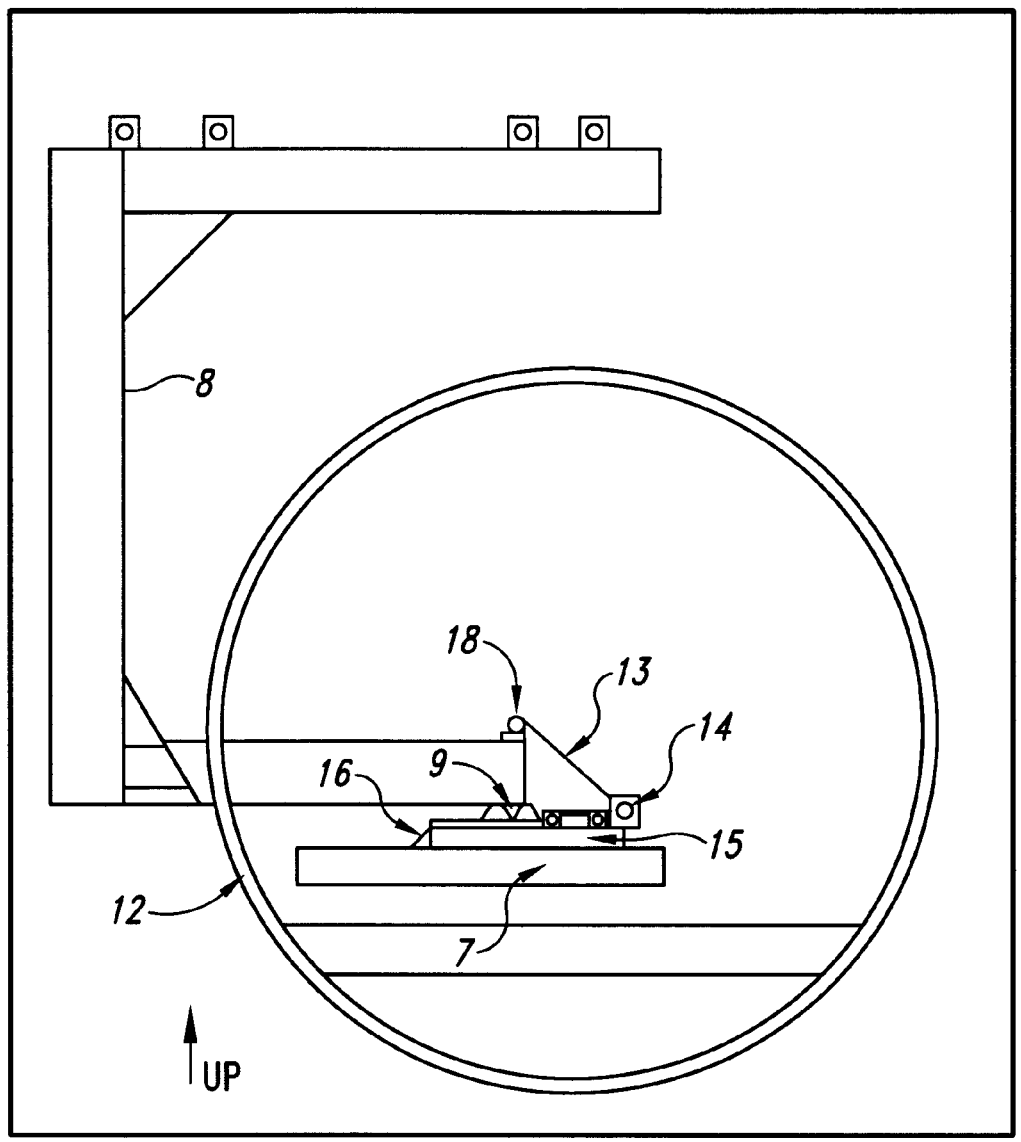
FIG. 20 shows a cross section view of the floor complex in a horizontal position inside the aircraft fuselage.

FIG. 20 shows the c-shaped lifting tool 8 and integral gimbal 9 attached to the strong-back 15 that is engaged to a floor beam complex 7. A cable 13 connects the pneumatic motor 14 to the cable fitting 18. Engaging the pneumatic motor 14 rotates the strong back 15 and the complex 7 about the gimbal 9 between the horizontal and vertical planes. Hard-point attachments 16 join the complex 7 to the strong-back 15. This view is a cross sectional view of the floor beam complex 7 in the horizontal position after being loaded into the fuselage 12.

This invention is not limited to the embodiments described above, but all changes and modifications thereof, not constituting departures from the spirit and scope of the invention, are intended to be included.

What is claimed is:

1. A method of jacking for an aircraft comprising:

providing a plurality of jacks, analytically dividing the aircraft into panels;

determining a weight and center of gravity for each panel;

providing a weight distribution for the length of the aircraft;

developing a shear and moment distribution utilizing multiple support locations to balance the aircraft weight distribution so that the shear and bending stresses are within a predetermined acceptance level; and then, simultaneously loading the jacks.

2. A method for jacking an aircraft for multiple floor-beam removal comprising the following steps:

weighing the aircraft and determining the center of gravity;

dividing the aircraft into a number of panels;

determining the weight and center of gravity for each panel thereby providing a weight distribution along the length of the aircraft;

balancing multiple jack inputs and the aircraft weight distribution until the fuselage shear and bending moments are reduced to a predetermined value;

jacking the aircraft on three main jacks and locating further jacks in accordance with the previous step; and loading all jacks simultaneously; and then, locking all jacks in place for multiple floor-beam removal.

* * * * *